United States Patent
Meyer

[15] 3,670,368
[45] June 20, 1972

[54] FASTENER

[72] Inventor: Engelbert A. Meyer, Union Lake, Mich.
[73] Assignee: USM Corporation, Warren Division, Mount Clemens, Mich.
[22] Filed: May 6, 1970
[21] Appl. No.: 35,056

[52] U.S. Cl. ..............................................24/73
[51] Int. Cl. ......................................A44b 21/00
[58] Field of Search ..............24/73; 211/177, 176, 148; 5/282, 283, 299; 52/718

[56] References Cited

UNITED STATES PATENTS

| 3,373,539 | 3/1968 | Meyer | 52/718 |
| 1,177,836 | 4/1916 | Vincent | 5/299 |
| 1,395,870 | 11/1921 | Pixley | 5/299 |
| 1,617,865 | 2/1927 | Richardson | 5/299 |

Primary Examiner—Bobby R. Gay
Assistant Examiner—Garry Moore
Attorney—Burton and Parker

[57] ABSTRACT

A fastener or adapter for attaching a molding member or the like to a panel surface having a headed button upstanding therefrom, comprising a panel engaging body having means for retaining the molding member tensioned against the panel and an inclined ramp tensioned against the underside of the button head, with a slot in the ramp accommodating the button shank and having a seat portion spaced laterally from the slot axis to prevent dislodgment of the fastener from the button once the molding is assembled on the fastener. An arcuately shaped edge on the slot serves to cam the button into the slot seat as the fastener is slid onto the button.

2 Claims, 4 Drawing Figures

PATENTED JUN 20 1972

INVENTOR
ENGELBERT A. MEYER
BY
Burton & Parker
ATTORNEYS

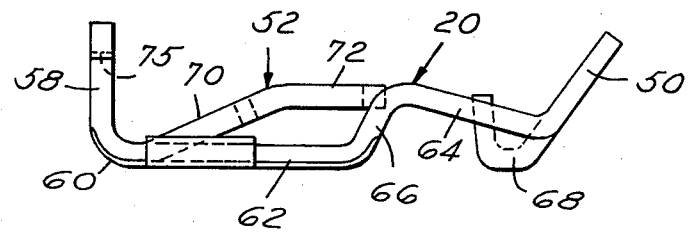
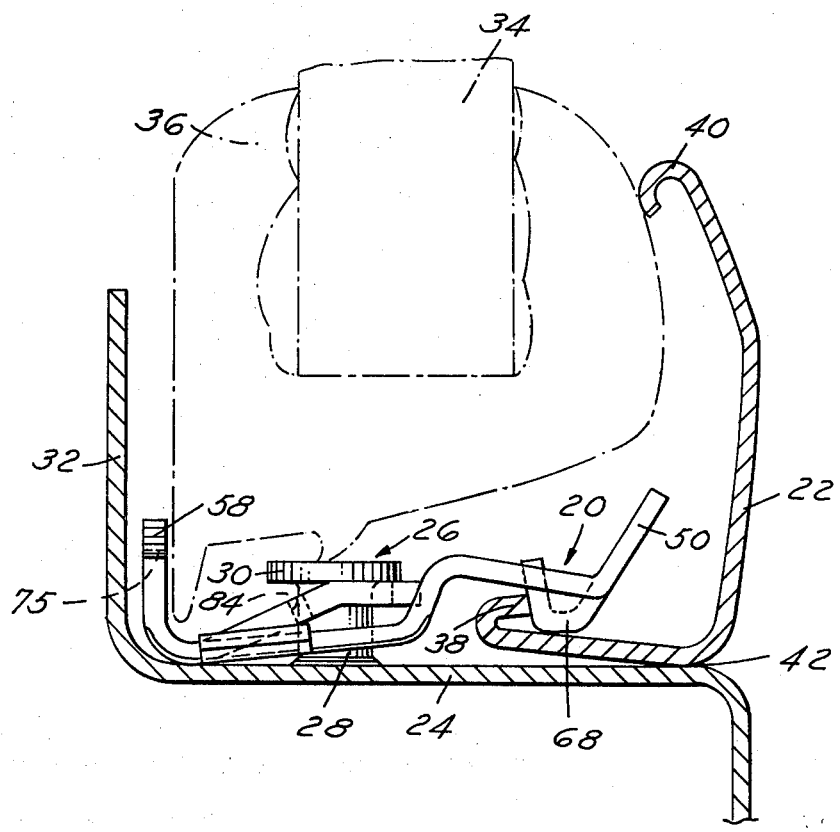

FASTENER

FIELD OF THE INVENTION

This invention relates generally to a fastener for connecting two structural parts, and more particularly to a clip adapter for attaching a strip of molding to a panel surface, with the adapter being retained by a headed button affixed to the panel. The button may be of the general type disclosed in my prior U.S. Pat. No. 3,373,539, having a shank whose end is welded or adhesively fixed to the panel, and a head spaced from the panel and having a diameter at least twice the diameter of the shank. The fastener has a slot therein to receive the button shank, the fastener surface adjacent the slot bearing against the underside of the button head to tension the fastener against the panel. The molding is engaged under a tab portion of the fastener which biases the molding edge against the panel surface.

The fastener herein disclosed is specifically adapted to retain the trim molding extending around the periphery of an automobile windshield or backlight, wherein the glass is set within a rubber gasket engaging the marginal edge of the glass, with the molding having opposite edge portions bearing against the gasket and the adjacent panel surface.

DESCRIPTION OF THE PRIOR ART

The prior art is well exemplified by my prior U.S. Pat. No. 3,373,539, which discloses a clip or fastener similar to that herein disclosed and adapted to be used in substantially the same environment. Such patent shows a clip having a U-shaped body with an inclined ramp disposed within the U with a button receiving slot in the ramp. The button is retained within the slot by a projecting tang having an edge facing the button when assembled on the clip to prevent its withdrawal. To assemble the clip and button the walls of the ramp must deform to allow the button to enter the slot seat past the projecting tang.

In conjunction with the safety standards being put into effect by the automobile manufacturers, some autos are presently being built with what may be called "pop-out" windshields, where the glass will be dislodged from its position upon being struck with a predetermined force from the inside of the vehicle. Such windshields are seated within a peripheral gasket of molded rubber, rather than an adhesive such as the polysulfides previously widely used. A trim molding surrounds the glass of the windshield and is retained in position by a series of buttons and adapters or clips, the buttons being fixed to the panel adjacent the windshield opening and the adapters being mounted on the buttons and retainably engaging the marginal edges of the molding.

Tests made on the above-described "pop-out" windshields have shown that a force against the windshield glass sufficient to cause it to pop out will also cause dislodgement of the clips. The clip or adapter shown herein is specifically designed to obviate that eventually and also to provide a simple, inexpensive structure which is more easily assembled with the buttons presently in use to provide a foolproof molding retainer assembly.

SUMMARY

An adapter for attaching a molding member to a panel having a headed button upstanding from the panel surface including a generally U-shaped body having panel engaging leg portions and a bight portion defining a tab for locking engagement with a marginal edge of said molding and an inclined ramp disposed within the U-shape and resiliently connected to the body and having a distal end biased against the underside of the button head, said ramp having a longitudinal slot opening through one edge thereof for receiving the button shank and terminating adjacent the ramp distal end in a button seat spaced laterally from the slot axis to prevent accidental dislodgment of the adapter from the button once the two are assembled. The slot is provided with an arcuately shaped wall portion adjacent the button seat to cam the button into engagement with the seat during assembly.

The instant invention is designed to obviate the problem of dislodgment of molding adapters from the buttons with which they are engaged, as frequently occurs with prior art adapters when subjected to impact forces. In addition, the invention is concerned with providing a simple, inexpensive fastener or adapter which may be more easily and conveniently assembled with the buttons than is possible with prior art structures.

BRIEF DESCRIPTION OF THE DRAWINGS

FIG. 3 is a side view of the adapter; and

FIG. 4 is a cross-sectional view through an automobile panel adjacent the windshield opening showing the windshield and its gasket and the fastener assembly for retaining the trim molding in place.

Shown in the drawings is a fastener or adapter generally indicated at 20 for securing a strip of molding or the like 22 to a panel 24. A headed button 26 is secured to the panel 24 as by welding the end of its shank 28 to the panel surface, thereby positioning the button head 30 in predetermined spaced, substantially parallel relation to the adjacent surface of the panel. In FIG. 4 the illustrated panel 24 is that part of an automobile body, and includes an upstanding flange called a pinchweld 32 forming the lower edge of a windshield opening, the windshield glass 34 being positioned within the opening and having a preformed molded rubber gasket 36 embracing its peripheral edge.

Figure 1:
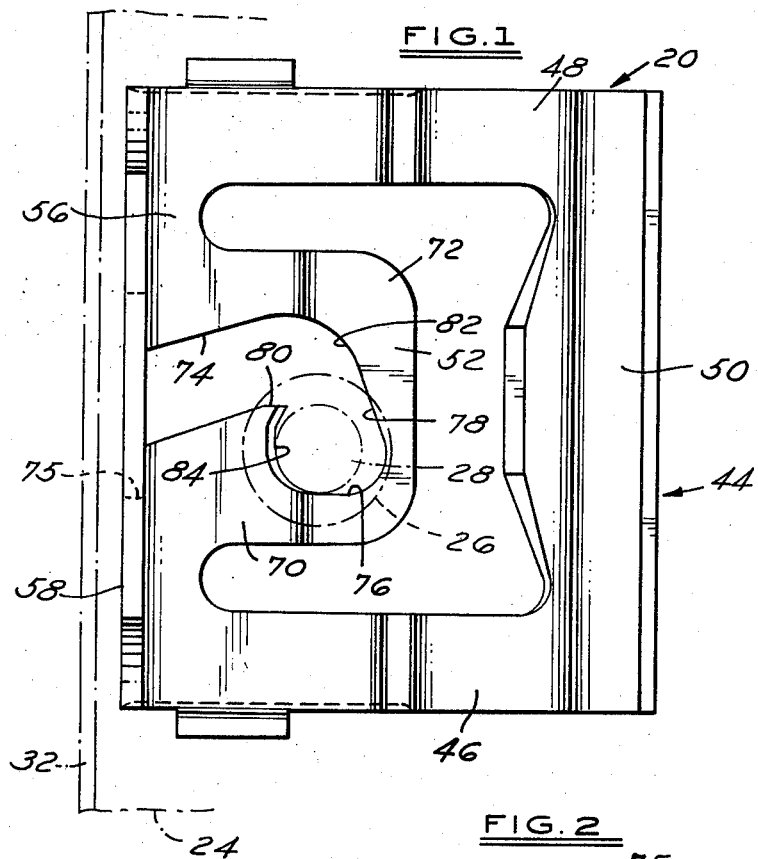
FIG. 1 is a plan view of an adapter embodying the invention, with the securing button and a portion of the panel being shown in phantom.
Figure 2:
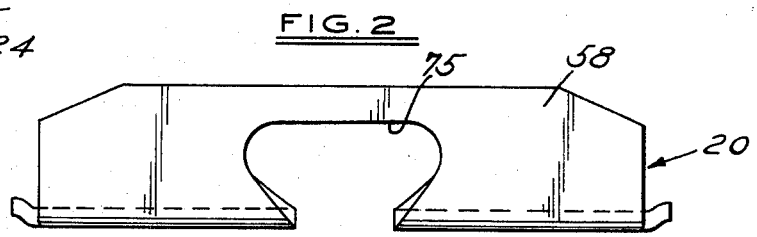
FIG. 2 is an end view of the adapter taken in the direction of the arrow 2 in FIG. 1.

The trim strip 22 has a reversely turned lower marginal edge 38 lockingly engaged with a portion of the adapter 20 and upper marginal bead 40 bearing against the rubber molding 36. Upon assembly of the strip 22, it is resiliently deformed slightly so that the engagement of the bead 40 against the rubber 36 tensions the strip against the panel in the area indicated at 42 in FIG. 4. This in turn exerts an outward (i.e. away from pinchweld 32) force on adapter 20 by its engagement with portion 38 of the molding 22.

The adapter 20 comprises in general a U-shaped body 44 having a pair of spaced parallel legs 46 and 48 interconnected by a bight 50, and an inclined ramp 52 resiliently connected to ends of the legs at 54 and 56. The inner end of the body 44, i.e. that end that lies adjacent the flange or pinchweld 32, is preferably formed into an upturned flange 58 which serves to give the body rigidity and also presents a smoothly rounded edge 60 abutting the panel surface to obviate scratching of the panel and provide easy sliding movement of the adapter during assembly.

The legs 46 and 48 of the body 44 are identical, and each has a panel engaging portion 62 adjacent its inner end and an outer end 64 spaced from the panel by an intermediate offset 66. The bridge or bight portion 50 of the body extends generally upwardly and away from the legs and is provided at its midportion with a depending tab 68 which is struck from the plane of the body and forms a projection for locking engagement with the end 38 of the molding strip 22.

The ramp 52 of the adapter 20 has an inclined portion 70 extending away from the panel surface 24 and a distal end portion 72 which lies in spaced, generally parallel relation to the panel. A slot 74 is cut into the ramp 52 and includes an enlarged aperture 75 opening through the body flange 58 to accommodate the headed button 26. The slot 74 may be disposed with its axis at a slight angle from the axis of the adapter, as shown in FIG. 1, and is sized to receive the shank 28 of button 26. A button seat 76 is provided at the closed end 78 of the slot, which seat is spaced laterally from the slot 74 and is provided with a rearwardly projecting tang or tip 80 at the entrance to the seat. Between the slot 74 and the seat 76 the opening has an arcuately marginal edge 82 to direct the button 26 into the seat 76 upon assembly of the adapter on the button.

Once the button 26 has been fixed in predetermined position on the panel 24 as by welding, the adapter 20 is assembled with the button by being slid along the panel surface from right to left as shown in FIGS. 1 and 4. This may be accomplished by hand, or a suitable tool may be used. As the button shank 28 enters the slot 74, it will abut against slot wall 82, and continued force on the clip will cause relative lateral movement thereof until the button shank abuts the end wall of the seat 76. The adapter is shown in its free position in FIG. 3, and the upper surface of distal end 72 of ramp 52 lies spaced from the underside of the panel engaging leg portion 62 a distance greater than the distance from the panel surface 24 to the underside of button head 30. Therefore upon assembly of the adapter 20 onto the button 26, the adapter is tensioned against the panel by the resilient spring-like action of the ram 52, urging the panel engaging portions 62 of the body legs 46 and 48 against the panel surface.

When the windshield 34 with its rubber molding 36 is positioned in place as shown in FIG. 4, the molding member or strip 22 is secured in place by sliding the lower end thereof under the adapter 20 until the edge 38 locks behind the depending tab 68 of the adapter. The upper bead 40 on the molding member 22 is tensioned against the rubber 36, and the member 22, by virtue of its contact with the panel 24 at 42, exerts an upward and outward force against adapter 20, thereby urging the edge 84 (FIGS. 1 and 4) of the slot seat into abutment against shank 28 of the button 26.

Because the adapter 20 is tensioned as above described away from the pinchweld 32, in order to dislodge the adapter from the button 26, the adapter must first be shifted inwardly toward pinchweld 32 to allow button shank 28 to clear tang 80, and then laterally until the button is aligned with slot 74. Hence a force tending to push windshield 34 out of its frame, i.e. from left to right as viewed in FIG. 4, will not cause dislodgment of the adapter from the button. Yet there is no interference between the adapter slot and the button shank, and assembly and disassembly can be easily effected between them, assuming of course that the molding member 22 is not engaged with the adapter 20. While only a single fastener assembly of adapter 20 and button 26 has been shown and described, a plurality are provided spaced along the panel to retain the molding member 22.

What is claimed is:

1. An adapter for securing a molding member to a support having a headed stud upstanding from the support surface, comprising a body defining a pair of spaced apart support engaging legs interconnected by a bridge portion having means for retaining said member, and an inclined ramp disposed generally between said legs and resiliently connected to said body at its proximal end with its distal end lying spaced from said support surface, a slot opening through the proximal end of said ramp sized to accommodate the stud shank and terminating in a stud seat portion adjacent the ramp distal end having a lateral dimension greater than the stud shank diameter, the midpoint of the seat lying spaced laterally from the axis of said entrance portion a distance greater than the stud shank diameter, with said slot having an intermediate portion defining an arcuate wall for camming engagement with said stud to cam the stud into said seat portion upon assembly of the adapter on the stud.

2. An adapter as defined in claim 7 characterized in that said slot includes a projecting tang positioned at the entrance to said seat portion on the side thereof opposite said arcuate wall.

* * * * *

PO-1050
(5/69)

UNITED STATES PATENT OFFICE
CERTIFICATE OF CORRECTION

Patent No. 3,670,368          Dated June 20, 1972

Inventor(s) Engelbert A. Meyer

It is certified that error appears in the above-identified patent and that said Letters Patent are hereby corrected as shown below:

In column 4, line 29, change the numeral "7" to --1--.

Signed and sealed this 19th day of September 1972.

(SEAL)
Attest:

EDWARD M. FLETCHER, JR.          ROBERT GOTTSCHALK
Attesting Officer          Commissioner of Patents